April 14, 1936. H. J. CRINER Re. 19,925

DRIVING MECHANISM FOR COMBINED WASHERS AND DRIERS

Original Filed Dec. 3, 1928 2 Sheets-Sheet 1

Harry J. Criner INVENTOR.

April 14, 1936. H. J. CRINER Re. 19,925

DRIVING MECHANISM FOR COMBINED WASHERS AND DRIERS

Original Filed Dec. 3, 1928 2 Sheets-Sheet 2

INVENTOR.

Harry J Criner

Reissued Apr. 14, 1936

Re. 19,925

UNITED STATES PATENT OFFICE 19,925

DRIVING MECHANISM FOR COMBINED WASHERS AND DRIERS

Harry J. Criner, Davenport, Iowa, assignor, by direct and mesne assignments, to The Apex Electrical Manufacturing Company, Cleveland, Ohio, a corporation of Ohio Original No. 1,815,190, dated July 21, 1931, Serial No. 323,528, December 3, 1928. Application for reissue June 22, 1933, Serial No. 677,096

18 Claims. (Cl. 74—75)

My invention relates to improvements in washing machines and centrifugal driers, and combined washers and driers.

The objects of my invention are:

1. To provide a unitary washer and centifugal drier of great simplicity and which will avoid the necessity of using gears, gear housings, wringers and various other parts now in common use.

2. To provide a combined washer and drier of neat appearance.

3. To provide a belt-drive for washing machine and drier, with means for operating both washer and drier either in unison or separately.

4. To provide an agitator for a washing machine which will cause a considerable mixture of air with the water and increase the bubbling and foaming thereby.

5. To provide means whereby the overflow from the drier can be directed back into the washer or into a receptacle outside the washer placed at any side thereof.

I attain these objects by the means illustrated in the accompanying drawings, in which,—

Figures 1, 2, 9:
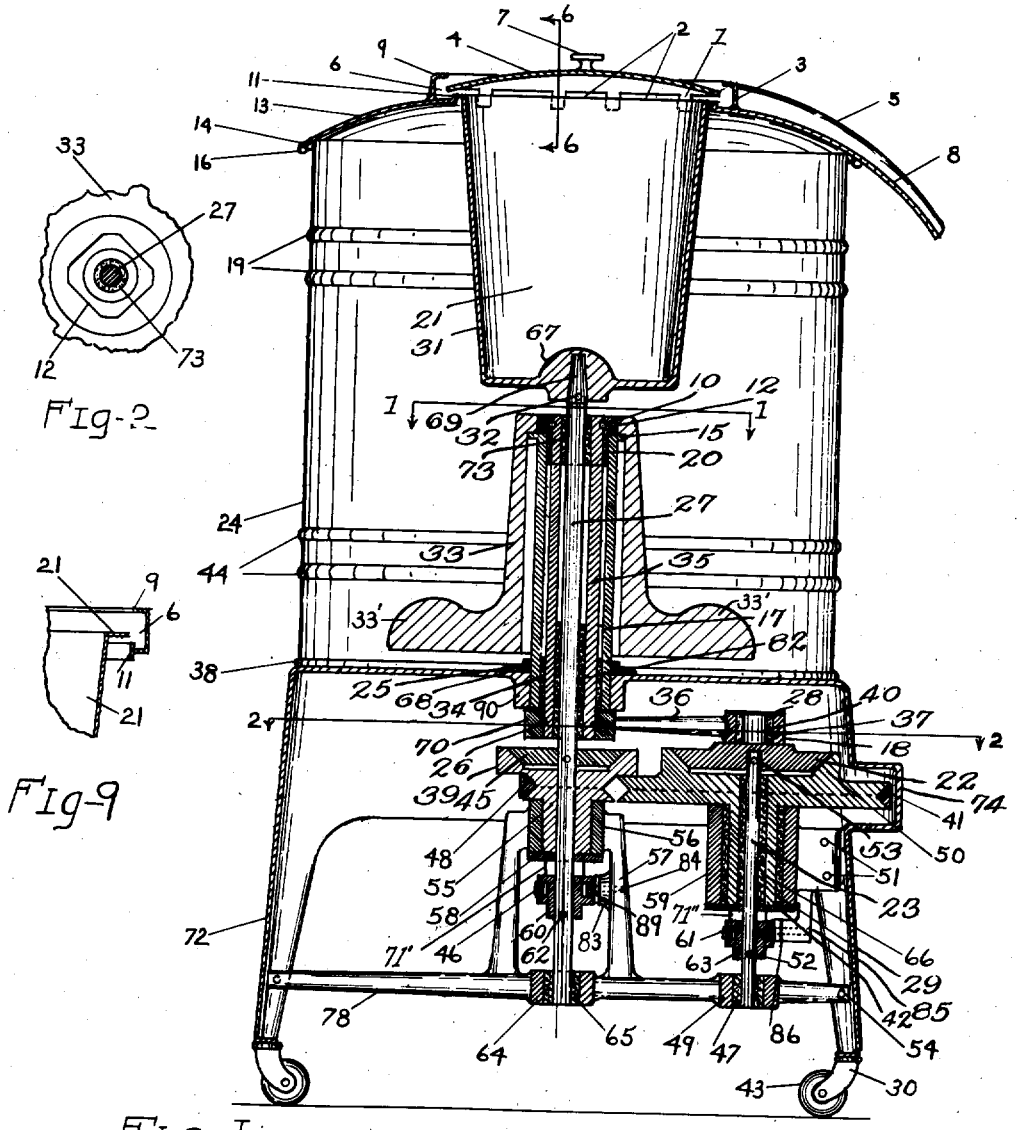
Figure 1 is a vertical section of my apparatus on the middle line.
Figure 2 is an enlarged detail of the agitator mounting on the line 1—1 of Figure 1.
Figure 9 is an enlarged detail section view showing an alternate form for the upper edge of the spin-basket and the channel formed upon the inner edge of the washer.
Figure 3:
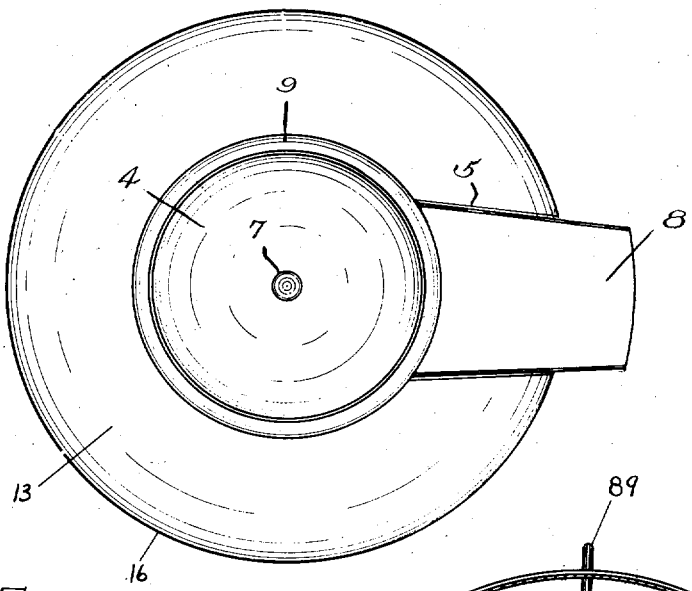
Figure 3 is a top or plan view of my machine.
Figure 7:
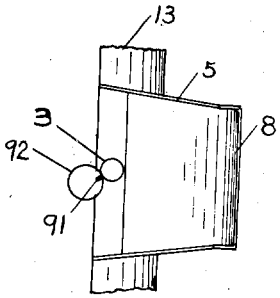
Figure 7 is a detail side view of the drain trough showing the washing machine lid broken away, to which I have added a gate, 92, adapted to close the opening 3, from the channel into the drain trough.
Figure 6:
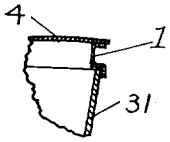
Figure 6 is an enlarged sectional detail showing the method of securing the lid of the centrifugal separator thereon.

My machine may be either round or rectangular, but I prefer to build it with a circular base, 71, having legs, 72, extending therefrom, and may be provided with castors, 30, with castor wheels, 43.

Upon this circular frame I secure a washer body or tub, 24, reinforced with beads, 19 and 44, rolled therein and having reinforcing wires, 38 and 14, rolled in in the usual manner to reinforce the bottom and top thereof.

An annular lid, 13, having its lower edge reinforced with a reinforcing wire, 16, rolled therein, rests upon the top of the tub, 24, and preferably revolves freely thereon. At the inner edge of the annular lid, 13, a slight flange, 11, is turned up and an annular flange, 9, is secured upon the top of the lid, 13, preferably by soldering, and the flanges, 11 and 9, form a channel, 6, to receive the water from the centrifugal separator and conduct it to the drain trough, 8, which is formed integral with or united to the lid, 13, at one side thereof, to conduct the water away from the separator and into an outside receptacle when desired.

When desired to return the water from the separator to the washer, the opening, 3, from the channel, 6, to the drain through, is closed by the slide, 92, which is pivoted (92) to the flange, 9, adjacent the opening, 3, therein.

Cross-bars, 78, have their outer ends united to the legs and at their center carry a boss, 64, in which an oilless bearing, 65, is mounted.

Arms, 57, are cast integral with the cross-bars, 78, extending upwardly therefrom, and have a boss, 56, cast integral therewith. In the boss is mounted a hub, 55, cast integral with a drive pulley, which also forms a part of the female member, 39, of the separator clutch. The male member, 45, of this clutch, is pinned or otherwise suitably secured to the shaft, 27, the lower end of which is mounted in the oilless bearing, 65, and the upper end of which is mounted in a bearing, 73, to be described hereafter.

The upper end, 69, of the shaft, 27, is tapered and may be squared or otherwise shaped to secure a firm hold upon a raised boss cast integral with the base of the spin-basket or receptacle, 21, of the separator, and the separator may be secured to the shaft by an additional pin, 32, if desired.

Resting upon the top of the spin-basket, 21, is a lid, 4, having a plurality of fingers, 1, extending downwardly therefrom and seating upon the upper edge of the spin-basket, 21. The spin-basket is preferably cast of aluminum, with a heavy base and with relatively thin sides as shown at 31.

At the center of the top of the frame, 71, a heavy boss, 90, is secured to or formed integral therewith, and carries a column, 17, rigidly secured therein, which may be surrounded by a gasket, 25. The column, 16, is threaded into the hub, 90, and the gasket, 25, is preferably threaded upon the column. At the upper end of the column, 17, a circular flange, 15, is formed integral therewith.

Within the column, 17, at the lower end thereof, an oilless bearing, 34, is fitted and within the upper end of the column, 17, a similar oilless bearing, 20, is fitted. A sleeve, 35, has its lower end mounted in the bearing, 34, and its upper end mounted in the bearing, 20. This sleeve, 35, extends below the bearing, 34, and has secured to its lower end a crank, 70, by pins, 26, or any other suitable means. Within the upper end of the sleeve, 35, I secure the oilless bearing, 73, in which the upper portion of the shaft, 27, is mounted. A similar bearing, 82, is mounted within the lower end of the sleeve, 35.

Upon the upper end of the sleeve, 35, I mount the hub, 12, of the agitator. The upper end of the sleeve, 35, is preferably cut in square form and the hub, 12, has a corresponding square opening cut therein and in addition may be secured to the sleeve, 35, by pins, 10.

My agitator comprises a hollow column, 33, with a plurality of wings or vanes, 33', united thereto. The outer end of the crank, 70, carries a pin or stud, 79, with an oilless bearing, 80, mounted thereon, and upon the oilless bearing, 80, is secured one end, 81, of the connecting rod, 36, the opposite end of which is secured upon an oilless bearing, 37, mounted upon a crank pin, 40, secured upon the surface of the male member, 22, of a cone clutch. The female member, 50, of the cone clutch, has formed integral therewith a pulley and a hub.

A boss, 59, is secured to one of the legs by pins or bolts, 51, and carries therein an oilless bearing, 29, within which the hub of the female member, 50, of the clutch is revolvably mounted.

This hub is hollow and carries within it an oilless bearing, 66, which in turn has revolvably mounted therein a shaft, 23, to the upper end of which the male member, 22, of the washer driving clutch, is secured by a pin, 53, or other suitable means. The lower end of the shaft, 23, is likewise mounted in a bearing, 47, secured within a boss, 49, formed integral with one of the cross-bars or cross-frame, 78.

A double flanged collar, 60, is secured upon the shaft, 27, and embraced by a yoke, 46, formed upon the inner end of the lever, 89. The collar, 60, is secured to the shaft, 27, by a pin, 62, and the lever, 89, is mounted upon a bolt or pin, 84, secured in a boss, 83, formed upon one of the arms, 57, the pin, 84, forming a fulcrum for the lever, 89. The outer end of the lever extends through an opening, 93, in the side wall, 71, extended downwardly at 71', and this opening is so shaped as to form a detent for the outer end of the lever, 89, and hold the male member, 22, of the separator clutch out of engagement with the female member thereof. When the upper end of the lever, 89, is released from the detent, the weight of the shaft and the part secured thereto, will hold the cone clutch in engagement and if desired, a spring may be added to secure firmer engagement of the clutch.

Figure 8:
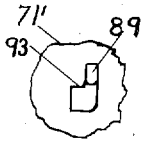
Figure 8 is a detail of the detent for the drier starting lever.
Figure 5:
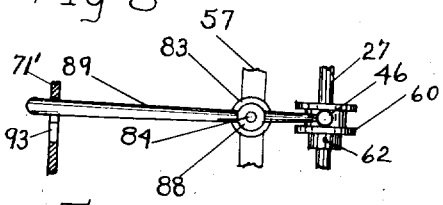
Figure 5 is a detail side view of the drier starting lever.
Figure 4:
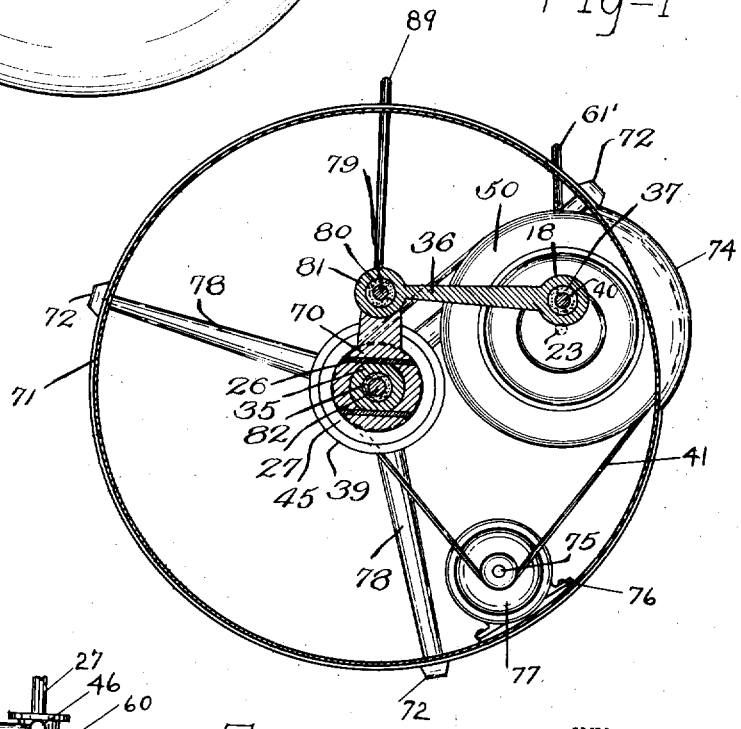
Figure 4 is a horizontal section looking downwardly on the line 2—2 of Figure 1.

A similar collar, 63, is secured to the shaft, 23, by a pin, 52, or other suitable means, and is embraced by a yoke, 61, formed upon the inner end of the lever, 61', which extends through the side walls of the frame, 71, as extended downward at 71'' and forms a detent in the same manner shown in Figure 8.

The weight upon the shaft, 23, will ordinarily be sufficient to secure the clutch members, 22 and 50, in engagement, but springs may be added to increase the pressure thereof if desired.

A belt, 41, is preferably mounted in V-shaped grooves, 48, formed in the pulleys and may be driven through the pulley, 75, by the motor, 77, secured to an extension of the frame, 71, by bolts, 76, or in any desired manner.

Any desired form of belt tightener may be added to keep the desired tension upon the belt, 41.

The frame, 71, may be extended outwardly as at 74 to form a housing for the washer drive pulley.

For bearings I prefer to use hard maple wood thoroughly soaked in lubricating oil, although graphited metal bearings or any other desired form of bearing may be utilized.

In the operation of my machine, the washwater is placed in the washer tub, 24, to the proper height, which would be somewhat above the beads, 44. The clothes and soap are then placed in the water and the motor started. The washer clutch is then thrown into engagement and the separator clutch thrown out of engagement. The motor then drives the washer and when the washing operation is completed, the motor may be stopped, the cover, 13, removed, and the clothes taken from the washer and put into the spin-basket, 21. A fresh batch of clothes to be washed may then be put into the washer, the lid of the spin-basket placed thereon, the motor started and both clutches thrown into engagement. The gate, 92, is then closed and the water will immediately enter the channel, 6, until it overflows the flange, 11, from which it will drop back into the tub.

The spin-basket, 21, has its sides inclined outwardly so that the centrifugal force when same is spun at a speed of 700 to 1000 R. P. M., will cause the water from the clothes to rise and overflow the upper edges of the spin-basket, from which it will pass through the opening, 2, into the channel, 6, as described.

When the clothes are properly dried from the centrifugal motion, the spin-basket may be stopped while the washer continues in motion and the clothes removed from the spin-basket.

When it is desired to rinse or blue the clothes, the rinsing water or bluing water may be put into the spin-basket and the gate, 92, left open. The water passing out of the spin-basket will then flow down the drain trough, 8, into another tube or receptacle arranged to catch same. When desired, the lid, 4, may be left off of the spin-basket, as it will operate without the lid, but when operated without the lid, I prefer to form a small outwardly projecting flange, 21', upon the top of the spin-basket, to assist in throwing the water into the channel, 6, as shown in Figure 9.

In the drawings, for clearness of illustration, I have shown the tub, 24, extending nearly to the top of the spin-basket, but it is obvious that the height of the tub may be varied to a considerable extent without departing from the spirit of my invention, it not being necessary to have the tub extend much above the bottom of the spin-basket and the lid of the tub may be sloped to correspond. It is also obvious that the size and relative proportions of the tub and of the spin-basket may be varied to suit the requirements of each particular case without departing from the spirit of my invention and the tub may be flared to allow more space between the tub and the spin-basket.

In rinsing clothes, as many rinse waters as desired may be used or the same rinsing water may be used a second or third time. Likewise, blueing water may be used repeatedly with successive batches of clothes.

It is obvious that my arrangement of washer and spin-basket may be used with any suitable form of drive and I do not confine my invention to the particular driving means shown. At the same time, said driving means contains substantial advantages and is a great improvement over any of the driving arrangements now in use because it obviates the necessity of oiling. It does away with all gears and the noise incident thereto. It avoids the necessity of a supporting post or column for the wringer and allows all of the machinery to be arranged out of danger of contact with the fingers of the operator.

While I have illustrated and prefer to use cone clutches because of their simplicity, durability, silence of operation and the very small amount of throw necessary to disengage them, I do not confine my invention to this particular form of clutch.

In connecting the connecting rod to the crank pin upon the upper member of the washer drive clutch, I prefer to use a self-aligning ball-bearing and I also use a similar ball-bearing in connecting the other end of the connecting rod to the crank mounted upon the washer drive sleeve, so as to allow sufficient play to make it easy to operate the clutch lever, but any form of connection allowing a slight degree of play, may be used.

I claim:

1. In a driving mechanism, a frame, a motor mounted upon the frame with belt pulley secured to the motor shaft, a boss secured to the frame, a drive pulley revolvably mounted within the boss and having a longitudinal opening through the center thereof and a clutch member united to said drive pulley, a shaft revolvably and slidably mounted within the opening of the drive pulley and bearing a complementary clutch member, such complementary clutch member carrying a crank pin, a supporting column mounted centrally of the frame, a sleeve revolvably mounted within the supporting column, a crank secured to the lower end of the sleeve, a connecting rod connecting the crank and crank pin, and means for throwing the clutch into and out of engagement.

2. A driving mechanism, comprising a frame, a motor mounted upon the frame with belt pulley secured to the motor shaft, a boss secured to the frame, a drive pulley revolvably mounted within the boss and having a longitudinal opening through the center thereof and a clutch member united to the drive pulley, a drive shaft revolvably mounted within the opening of the drive pulley and bearing a complementary clutch member pinned thereto, said clutch member carrying a crank pin, a supporting column mounted in the center of the tub and secured to the bottom thereof, a sleeve revolvably mounted within the supporting column, a crank secured to the lower end of the sleeve, a connecting rod connecting the crank and above mentioned crank pin, a driven shaft revolvably mounted within the sleeve and extending outwardly at both ends thereof, a male clutch member secured to the intermediate portion of the shaft, cross members united to the bottom of the frame and supporting a bearing, an integral female clutch member, pulley, and hub—the hub being mounted within last mentioned bearing, means for throwing the respective clutches into and out of engagement separately, and a belt passing around the motor shaft pulley and the clutch pulleys adapted to drive the latter.

3. A multiple differential driving mechanism comprising a frame, a belt-driving prime mover mounted thereon, a belt, jack-shaft supports secured to the frame, a jack-shaft slidingly mounted therein, a pulley revolvably mounted upon the jack-shaft adapted to be driven by the belt, in which pulley the jack-shaft is free to move longitudinally, a cone clutch-member formed integral with said pulley, a complementary clutch-member united to the jack-shaft, a crank pin united to the last mentioned clutch member and adapted to revolve with the pulley when the clutch members are in engagement, a hollow column secured centrally of the frame, a sleeve reciprocatingly revolvable in the column, a crank united to the lower end of the sleeve, a connecting rod connecting said crank and the crank pin above mentioned, a driven shaft revolvably mounted within the sleeve, a belt-driven pulley revolvably mounted upon the driven shaft which shaft is slidable longitudinally therein and bearing one member of a clutch, a complementary member of said clutch being united to said driven shaft, and a separately operable means for raising the jack-shaft and the driven shaft respectively sufficiently to disengage said clutches.

4. A multiple differential driving mechanism comprising a frame, a belt-driving prime mover mounted thereon, a belt, jack-shaft supports secured to the frame, a jack-shaft slidingly mounted therein, a pulley revolvably mounted upon the jack-shaft adapted to be driven by the belt, in which pulley the jack-shaft is free to move longitudinally, a cone-clutch-member formed integral with said pulley, a complementary clutch-member united to the jack-shaft, a crank pin united to the last mentioned clutch-member and adapted to revolve with the pulley when the clutch-members are in engagement, a hollow column secured centrally of the frame, a sleeve reciprocatingly revolvable in the column, a crank united to the lower end of the sleeve, a connecting rod connecting said crank and the crank pin above mentioned, a driven shaft revolvably mounted within the sleeve, a belt-driven pulley revolvably mounted upon the driven shaft which shaft is slidable longitudinally therein and bearing one member of a clutch, a complementary member of said clutch being united to said driven shaft, a separately operable means for raising the jack-shaft and the driven shaft respectively sufficiently to disengage said clutches, and means for separately locking said clutches respectively in their engaged or disengaged positions.

5. In a driving mechanism, a frame, a belt-driving prime mover mounted thereon, a belt, jack-shaft supports secured to the frame, a jack-shaft slidingly mounted therein, a pulley revolvably mounted upon the jack-shaft adapted to be driven by the belt and in which pulley the jack-shaft is free to move longitudinally, a cone clutch-member formed integral with said pulley, a complementary clutch-member rigidly united to the jack-shaft, and means for moving the jack-shaft longitudinally sufficiently to disengage said clutch-members.

6. In a driving mechanism, a frame, a belt-driving prime mover mounted thereon, a belt, jack-shaft supports secured to the frame, a jack-shaft slidingly mounted therein, a pulley revolvably mounted upon the jack-shaft adapted to be driven by the belt and in which pulley the jack-shaft is free to move longitudinally, a cone clutch-member formed integral with said pulley, a complementary clutch-member rigidly united to the jack-shaft, a collar rigidly secured to the jack-shaft, a lever pivotally mounted on the frame having one end formed into a yoke adapted to embrace the collar and its opposite end forming a handle for manual control.

7. In a mechanism of the class described, a rotatable and an oscillatable driven device both operable about one and the same axis, driven belt pulleys operably associated with said devices, a driving belt pulley, a single power transmission belt connecting said driving belt pulley to said driven belt pulleys, motion converting means interposed between said oscillatable driven device and one of said driven belt pulleys, and a disengageable driving connection between said oscillatable driven device and the driven belt pulley associated therewith for controlling the operation of said oscillatable driven device.

8. In a mechanism of the class described, a rotatable driven device, an oscillatable driven device, driven belt pulleys operably associated with said devices, a driving belt pulley, power transmission belt means connecting said driving belt pulley to said driven belt pulleys, motion converting means including crank arms and an interconnecting pitman rod interposed between said oscillatable driven device and one of said driven belt pulleys, and disengageable driving connections between said driven pulleys and said driven devices for controlling the operation of said driven devices.

9. In a mechanism of the class described, a rotatable and an oscillatable driven device both operable about one and the same axis, driven belt pulleys operably associated with said devices, a driving belt pulley, power transmission belt means connecting said driving belt pulley to said driven belt pulleys, motion converting means including crank arms and an interconnecting pitman rod interposed between said oscillatable driven device and one of said driven belt pulleys, and disengageable driving connections between said driven pulleys and said driven devices for controlling the operation of said driven devices.

10. In a mechanism of the class described, a rotatable and an oscillatable driven device both operable about one and the same axis, driven belt pulleys operably associated with said devices, a driving belt pulley, power transmission belt means connecting said driving belt pulley to said driven belt pulleys, motion converting means including crank arms and an interconnecting pitman rod interposed between said oscillatable driven device and one of said driven belt pulleys, a clutch for controlling the driving connection between one of said driven pulleys and said oscillatable driven device, the cooperating elements of said clutch including a part fixed for movement with one of said crank arms and a part fixed for movement with said last mentioned driven pulley, and manually operable control devices for effecting engagement and disengagement of such clutch parts.

11. In a driving mechanism, a frame, a motor mounted upon the frame with a belt pulley secured to the motor shaft, a bearing secured to the frame, a drive pulley having a part revolvably mounted within the bearing, a clutch comprising a member united to said drive pulley and a complementary member coaxial therewith, a shaft revolvably journaled in said drive pulley and carrying said complementary clutch member, a crank pin rigid with said shaft and said complementary clutch member, said clutch members being relatively movable with respect to each other, a supporting column mounted centrally of the frame, a sleeve revolvably mounted within the supporting column, a crank secured to the lower end of the sleeve, a connecting rod connecting the crank and crank pin, and means for throwing the clutch into and out of engagement.

12. A multiple differential driving mechanism comprising a frame, a belt-driving prime mover mounted thereon, a belt, shaft supports secured to the frame, a shaft rotatably carried thereby, a pulley revolvably mounted upon the shaft and adapted to be driven by the belt, said pulley and shaft being axially movable with respect to each other, a clutch comprising a clutch-member rigid with said pulley and a complementary clutch-member united to the shaft, a crank pin united to the last mentioned clutch member and adapted to revolve with the pulley when the clutch members are in engagement, a hollow column secured centrally of the frame, a sleeve journaled in the column, a crank united to the lower end of the sleeve, a connecting rod connecting said crank and the crank pin above mentioned, a driven shaft revolvably mounted within the sleeve, a belt-driven pulley revolvably mounted upon the driven shaft and bearing one member of a second clutch, said driven shaft and pulley being axially movable with respect to each other, a complementary member of said second clutch being united to said driven shaft, and a separately operable means to selectively disengage said clutches.

13. A multiple differential driving mechanism comprising a frame, a belt-driving prime mover mounted thereon, a belt, shaft supports secured to the frame, a shaft rotatably carried thereby, a pulley revolvably mounted upon the shaft and adapted to be driven by the belt, said pulley and shaft being axially movable with respect to each other, a clutch comprising a clutch-member rigid with said pulley and a complementary clutch-member united to the shaft, a crank pin united to the last mentioned clutch-member and adapted to revolve with the pulley when the clutch-members are in engagement, a hollow column secured centrally of the frame, a sleeve journaled in the column, a crank united to the lower end of the sleeve, a connecting rod connecting said crank and the crank pin above mentioned, a driven shaft revolvably mounted within the sleeve, a belt-driven pulley revolvably mounted upon the driven shaft and bearing one member of a second clutch, said driven shaft and pulley being axially movable with respect to each other, a complementary member of said second clutch being united to said driven shaft, a separately operable means for raising one of the clutch-members of each of said clutches sufficiently to disengage said clutches, and means for separately locking said clutches respectively in their engaged or disengaged positions.

14. In a mechanism of the class described, a rotatable driven device and an oscillatable driven device, coaxial inner and outer shafts adapted to be connected one to each of said devices, rotatable driven elements operably associated with said driven devices, a rotatable driving element for said driven elements, endless, flexible, power-transmission means connecting said driving element to said driven elements, motion converting means interposed between said oscillatable driven device and one of said driven elements, and disengageable driving connections between said rotatable and said oscillatable driven devices and the rotatable driven elements associated therewith for selectively controlling the operation of said driven devices whereby they are capable of either independent or co-joint use.

15. In a mechanism of the class described, a rotatable driven device and an oscillatable driven device, coplanar rotatable driven elements operably associated with said driven devices, a rotatable driving element for said driven elements located in the plane of said driven elements, a flexible power-transmission member connecting said driving element to said driven elements, motion converting means interposed between said oscillatable driven device and one of said driven elements, and a disengageable driving connection between said oscillatable driven device and the rotatable driven element associated therewith for controlling the operation of said oscillatable driven device.

16. In a mechanism of the class described, a rotatable driven device and an oscillatable driven device, coaxial inner and outer shafts, said inner shaft being connected to said oscillatable driven device and said outer shaft being connected to said rotatable driven device, coplanar rotatable driven elements operably associated with said driven devices, a rotatable driving element for said driven elements located in the plane of said driven elements, a flexible power-transmission member connecting said driving elements to said driven elements, motion converting means interposed between said oscillatable driven device and one of said driving elements, and a disengageable driving connection between said oscillatable driven device and the rotatable driven element associated therewith for controlling the operation of said oscillatable driven device.

17. In a mechanism of the class described, a rotatable driven device and an oscillatable driven device, co-planar rotatable driven elements operably associated with said driven devices, a rotatable driving element for said driven elements located in the plane of said driven elements, flexible power-transmission means connecting said driving element to said driven elements, motion converting means interposed between said oscillatable driven device and one of said driven elements, disengageable driving connections between said driven devices and said driven elements, and control means for said disengageable driving connections for selectively operating one or the other of said driven devices or for simultaneously operating both of said driven devices.

18. In a mechanism of the class described, a rotatable driven device and an oscillatable driven device, coplanar rotatable driven elements operably associated with said driven devices, a rotatable driving element for said driven elements located in the plane of said driven elements, a flexible power-transmission member connecting said driving element to said driven elements, and motion converting means interposed between said oscillatable driven device and one of said driven elements.

HARRY J. CRINER.